United States Patent [19]

Carmien

[11] Patent Number: 5,310,230
[45] Date of Patent: May 10, 1994

[54] CLOSED BACK SHOVEL AND METHOD OF ASSEMBLY

[75] Inventor: Joseph A. Carmien, 525 N. Maple Dr., Beverly Hills, Calif. 90210

[73] Assignee: Joseph Allen Carmien, Beverly Hills, Calif.

[21] Appl. No.: 6,127

[22] Filed: Jan. 19, 1993

Related U.S. Application Data

[63] Continuation of Ser. No. 757,670, Nov. 7, 1991, abandoned, which is a continuation-in-part of Ser. No. 712,690, Jun. 10, 1991, Pat. No. 5,123,304.

[51] Int. Cl.$^5$ ............................................. A01B 1/22
[52] U.S. Cl. ................................. 294/49; 403/298; 76/113
[58] Field of Search ............... 294/49, 51, 57; 76/113, 76/119; 403/292, 295, 298

[56] References Cited

U.S. PATENT DOCUMENTS

| | | | |
|---|---|---|---|
| 657,422 | 9/1900 | Judd | 294/49 |
| 1,374,336 | 4/1921 | Surbaugh | 294/57 X |
| 1,755,236 | 4/1930 | Brandenburg | 294/57 |
| 2,031,556 | 2/1936 | Brandenburg | 294/49 |
| 2,063,774 | 12/1936 | Washington | 294/49 |
| 2,238,104 | 4/1941 | Finley | 294/57 |
| 3,549,189 | 12/1970 | Alosi | 294/57 |
| 4,050,727 | 9/1977 | Bonnes | 294/57 X |
| 4,451,073 | 5/1984 | Carmien | 294/57 |

FOREIGN PATENT DOCUMENTS 1376180 12/1974 United Kingdom .............. 294/49

Primary Examiner—Dean J. Kramer
Attorney, Agent, or Firm—Kelly, Bauersfeld & Lowry

[57] ABSTRACT

A closed back shovel is fabricated by placing a frog within a back-side cavity of a standard open back shovel head. The frog is configured to fill the back-side cavity of the shovel blade. A tang element interconnects the frog and a forward end of a tool handle positioned within a tool receiving socket of the blade, within a handle receiving socket, to secure the tool handle to the shovel head. A process for assembling a closed back shovel includes the steps of securing the tang element to the frog, heating the tang element and placing the frog within the back-side cavity of the shovel blade so that the tang element extends into the handle receiving socket, and aligning a tool handle with the tang element by inserting the handle front end into the handle receiving socket. The tool handle includes a thermoplastic section in proximity into the front end thereof, having an elongate tang receiving channel. The heated tang element is driven into the tang receiving channel such that as the tang element engages the tool handle, the thermoplastic section surrounding the tang receiving channel is softened and flows into intimate contact around the tang element and then hardens as the heat of the tang element is dissipated to hold the tang element in place.

19 Claims, 2 Drawing Sheets

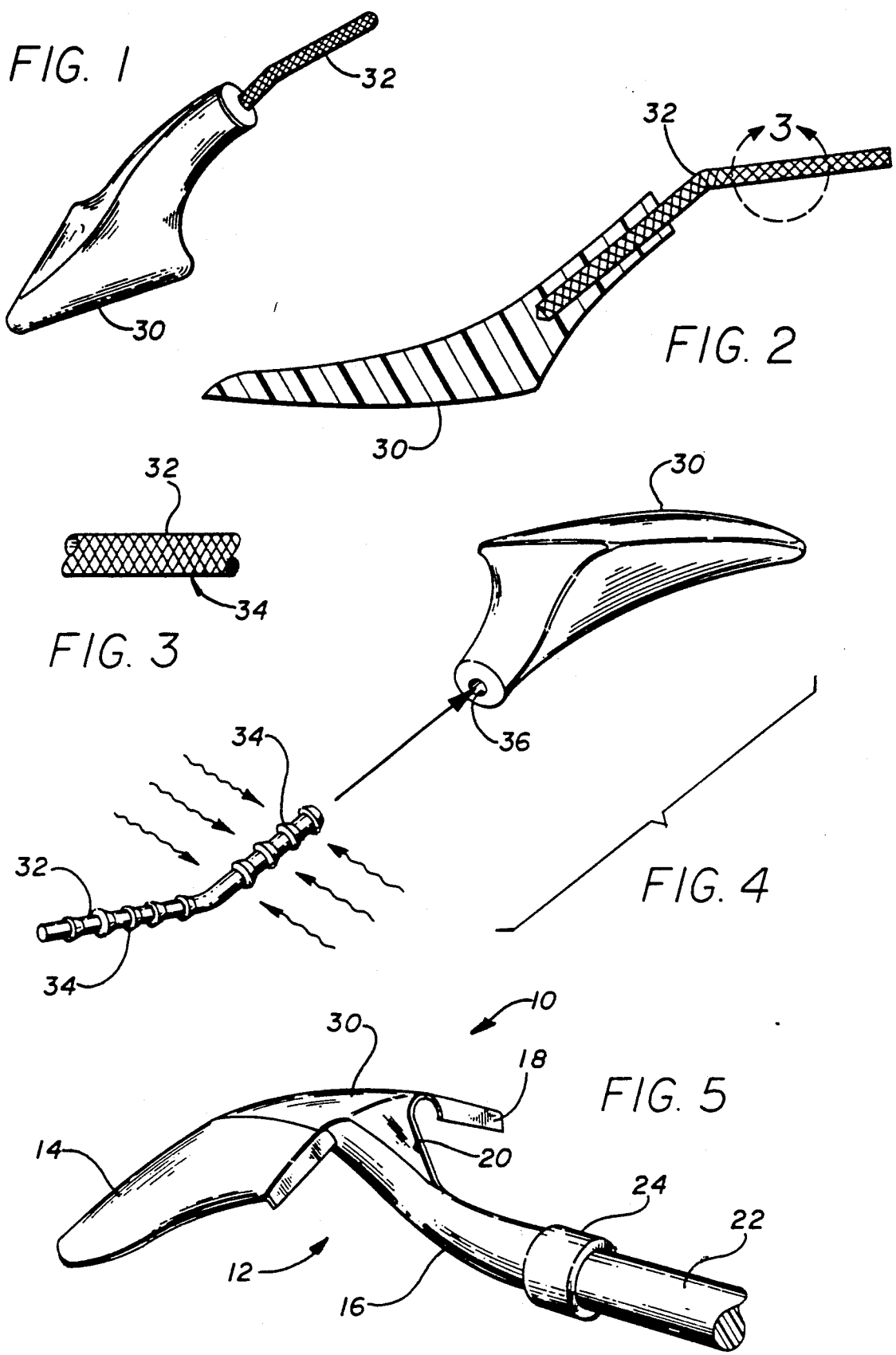

CLOSED BACK SHOVEL AND METHOD OF ASSEMBLY

RELATED APPLICATION

This is a continuation of U.S. patent application Ser. No. 07/757,670, filed Nov. 7, 1991, now abandoned, which is a continuation-in-part of U.S. patent application Ser. No. 07/712,690, filed Jun. 10, 1991 and entitled PROCESS FOR ATTACHING TOOL HEADS TO ENDS OF COMPOSITE HANDLES now U.S. Pat. No. 5,123,304.

BACKGROUND OF THE INVENTION

This invention relates generally to processes for assembling hand tools. More specifically, the present invention relates to closed back shovels and to a novel process for manufacturing such shovel heads and attaching them to the ends of composite handles.

In manufacturing handles for hand tools such as shovels, rakes and the like, competing design considerations are at play. On the one hand it is desirable to have a handle that is as light as possible, to provide for easy use by consumers. On the other hand the handle must have the structural integrity to withstand the variety of stresses that will be placed on it. Wooden handles have been used, but these provide an unacceptable compromise of weight for structural integrity.

An alternative to wooden handles is the use of rods formed from resin coated fibers. The basic technique for running filaments through a resin bath and then into a long heated die tube to produce a cured composite of the same shape as the die tube has been known for some time. See, for example, U.S. Pat. Nos. 2,948,649 and 3,556,888. This method, however, produces a solid extruded product which is unacceptably heavy and/or too costly.

The weight problem can be alleviated by means of an existing process to extrude hollow tubes utilizing a die tube with the center filled, leaving an annular cross-section through which the fibers are pulled. However, this weight reduction is achieved at the cost of significantly lower tensile and compression (bending) strength than that of a solid rod, and therefore would not be suitable for use in certain high-stress applications such as general purpose shovel handles. Further, to increase interlaminar strength, a substantial percentage of fibers running other than in a longitudinal direction may be required. Moreover, commercial machines for producing continuous hollow tubing are extremely expensive.

As illustrated and described in U.S. Pat. Nos. 4,570,938 and 4,605,254 (the contents of which are incorporated herein by reference), the bending strength of tool handles can be improved by producing rods which are substantially hollow or lightweight throughout most of their length, but reinforced at areas of expected increased stresses. Typically, one of the areas to be reinforced in a hand tool is at the front end, where the attachment between the tool head and the handle is effected.

Many hand tools such as hoes, cultivators, rakes and the like, are provided with tangs or an elongated piece of metal which is part of the tool head and is used traditionally to attach the tool head to a wooden handle. There are millions of such tool heads in existence which may be reused with replacement tool handles. To attach such tanged tool heads to composite handles, typically a bore is provided in the front end of the composite tool handle having a diameter larger than the cross-sectional dimensions of the tang itself. The tang is attached to the composite rod by bonding or chemically adhering the tang within the bore. This process, however, has been found to be unacceptably costly and time consuming, and not well suited for field replacement of wooden tool handles.

Problems have also been encountered in the attachment of composite tool handles to socketed tool heads, such as shovel blades, as described in U.S. Pat. No. Re. 32,364. A large percentage of shovel blades are made by starting with a sheet steel blank, and stamping out the configuration of a shovel with the appropriate shape for a digging portion, the socket, and the structural stiffening sections. The traditional process of forming a shovel blade creates a substantial back-side cavity or hollowed-out area between the end of the shovel socket and approximately the center of the blade. This cavity or recess is very undesirable in anything but the cheapest shovels, as it is prone to collect dirt, clay, mud or other materials during use, which adds substantially to the weight of the shovel.

To eliminate or substantially reduce this back-side cavity, shovel blades are modified into what is called a closed back (as opposed to an open back) configuration. This is accomplished by means of welding a roughly triangular steel plate over the cavity. This process increases the costs associated with manufacturing a closed back shovel blade, since there is an additional ten to fifteen inches of welding, slag cleaning, and further re-heat treating or annealing of the shovel blade to eliminate brittle spots caused by the welding process.

To accommodate the decreasing strength of available wood handle materials, the length of the blade socket of most shovels has grown over the years. Much of the material utilized for the socket can be eliminated as wasteful, however, when a superior strength composite handle is utilized in place of wood. In the past, however, composite-type handles have been attached to the shovel blade by means of a screw, rivet or the like, which mechanically attaches the front end of the tool handle to the shovel socket. In some limited instances, even this method of attachment can undesirably degrade the overall strength and working characteristics of the tool handle.

Accordingly, there has been a need for a novel process for manufacturing closed back shovels and for attaching such shovel heads to ends of composite handles which simplifies prior processes, eliminates the waiting time associated with bonding processes, and facilitates the rapid assembly of closed back shovels to increase manufacturing cost efficiencies. Such an assembly process must provide a means for securely holding the tool head relative to the handle under all anticipated working conditions. Additionally, a novel assembly process is needed which can be utilized to quickly and efficiently create a closed back shovel simultaneously with attaching the composite handle to a standard open back shovel blade. Moreover, a closed back shovel is needed which eliminates the prior requirement of welding a plate over the back-side cavity of the shovel blade, and the increased manufacturing costs associated therewith. The present invention fulfills these needs and provides other related advantages.

SUMMARY OF THE INVENTION

The present invention resides in a novel process for attaching standard open back shovel heads to composite tool handles so that the resultant product is a closed back shovel. The process of the present invention provides a highly efficient and economical method for assembling closed back shovels, which avoids many of the drawbacks of the prior art. The process of the present invention comprises the steps of heating an elongated tang element fixed relative to a frog, placing the frog within a back-side cavity of a standard shovel blade so that the heated tang element extends into a handle receiving socket, and aligning a front end of a composite tool handle including a thermoplastic section with the rearwardly extending tang element. The heated tang element is then driven into the thermoplastic section such that as the heated tang element engages the tool handle, the thermoplastic section is softened to permit entry of the tang element. The thermoplastic material of the thermoplastic section flows into intimate contact around the tang element and then hardens as the heat of the tang element is dissipated to hold the tang element in place.

In one preferred form of the invention, a standard open back shovel head is utilized which includes a blade portion, a back-side cavity in the blade portion, and a handle receiving socket which extends rearwardly from the blade portion. A composite tool handle is utilized having a forward end adapted for insertion into the handle receiving socket of the shovel head. The forward end of the tool handle includes a thermoplastic section having an elongate tang receiving channel therein.

The frog is configured to fill the back-side cavity of the blade portion, and at least a portion of the frog comprises a thermoplastic or thermoset material. The frog is configured, further, to extend from the back-side cavity into the handle receiving socket of the shovel head. The frog may include an elongate tang receiving channel similar to that provided in the forward end of the composite tool handle.

The tang element provides means for interconnecting the frog and the forward end of the tool handle, within the handle receiving socket, to secure the tool handle to the shovel head. The tang element preferably has one end secured within the thermoplastic section of the tool handle, and another end secured within the thermoplastic portion of the frog. The tang element includes surface irregularities to inhibit removal of the tang element from the frog and the tool handle. The tang receiving channel has cross-sectional dimensions less than the cross-sectional dimensions of the tang element within the range of 0.015 inch to 0.025 inch.

The tang element is preferably pre-secured to the frog, and is then heated within a heating block to a temperature within the range of 300° F. to 500° F. The frog is then positioned within the back-side cavity of the shovel blade such that the tang element extends rearwardly into the handle receiving socket. The elongated tang receiving channel within the thermoplastic section of the composite tool handle is aligned with the tang element by simply placing the forward end of the tool handle into the handle receiving socket of the shovel head. A high strength compression collar or ring may be mounted at the mouth of the handle receiving socket to preclude the socket from opening under applied loads. When the tool handle is so positioned, the heated tang element may be driven into the tang receiving channel such that as the tang element engages the tool handle, the thermoplastic section surrounding the tang receiving channel is softened and flows into intimate contact around the tang element and then hardens as the heat of the tang element is dissipated.

In another preferred form of the invention, the thermoplastic section of the tool handle includes a flexible core which, with the frog, substantially fills the handle receiving socket. The flexible core includes an elongated, generally cylindrical body, at least one groove formed in the body forming at least one socket filler for bearing a compressive load in the handle receiving socket, and a flexible shaft capable of bending to permit the core to conform to the shape of the handle receiving socket. The heated tang element, which has been pre-secured to the frog, may be driven into the flexible core as described above to interconnect the frog and the tool handle. This has the effect of securing the tool handle to the shovel head while simultaneously filling the back-side cavity of the shovel blade to form a closed back shovel.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a top, front and left side perspective view of a frog utilized as a filler for a back-side cavity of a shovel blade, and a rearwardly extending tang element;

FIG. 2 is an enlarged partially sectional elevational view taken generally along the line 2—2 of FIG. 1;

FIG. 3 is an enlarged fragmented elevational view of the portion of the rearwardly extending tang element designated by the arrow 3 in FIG. 1, showing diamond knurling applied to an exterior surface of the tang element to provide surface irregularities thereon;

FIG. 4 is an exploded bottom, rear and left side perspective view of the frog illustrated in FIG. 1 and an alternative tang element, schematically showing the process by which the tang element is attached to the frog;

FIG. 5 is a perspective view of a portion of a closed back shovel, wherein a composite tool handle is assembled to a shovel blade having a back-side cavity, and the frog of FIGS. 1-4 is utilized to fill the back-side cavity;

DETAILED DESCRIPTION OF THE PREFERRED EMBODIMENTS

Figure 6:
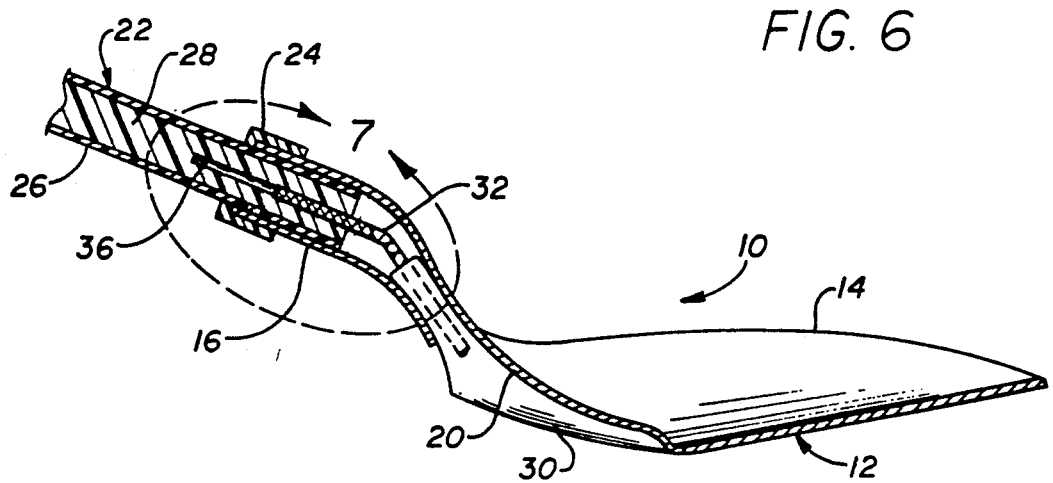
FIG. 6 is an enlarged sectional view taken generally along the line 6—6 of FIG. 5.

As shown in the drawings for purposes of illustration, the present invention is concerned with a closed back shovel 10, and a novel process for assembling the shovel. The shovel 10 comprises, generally, a shovel head 12 including a blade portion 14, an integral handle receiving socket 16, and a foot tread 18. The shovel head 12 is typically forged or stamped from a single sheet metal blank and formed into the desired configuration by well-known stamping and forming procedures. In order to provide appropriate stiffness for the blade portion 14 relative to the socket 16, a back-side cavity 20 adjacent to the socket 16 is usually formed. The socket 16 is dimensioned to receive a composite tool handle 22. To preclude the socket 16 from opening under applied loads, a high strength compression collar 24 may be mounted at the mouth of the socket.

As illustrated and described in U.S. Pat. Nos. 4,570,988 and 4,605,254, the composite tool handle 22 is manufactured by drawing a fiber material through a resin bath and into a die tube where the fibers are heated and cured by a heating element surrounding the die tube. The cured rod is pulled out of the die tube by tractor type pullers and cut to the desired length by a conventional cutting device. As the fibers enter the die tube, alternating sections of lightweight tubing and reinforcing core are inserted into the center of the die tube and are simultaneously surrounded by the fibers and drawn into and through the die tube. By this method, a continuous hollow fiberglass rod 26 can be quickly and easily manufactured with a reinforced section integrally included at any desired location. For purposes of the present invention, at least one section of a thermoplastic reinforcing core 28 within the fiberglass rod 26 should be located at the front or forward end of the composite tool handle 22.

In accordance with the present invention, and as illustrated with respect to a first preferred form in FIGS. 1–7, a frog 30 is provided for substantially filling the back-side cavity 20 of the shovel head 12. A tang element 32 having surface irregularities 34 is secured within the frog 30 and positioned so as to extend generally centrally into the socket 16 of the shovel head 12 when the frog is positioned within the back-side cavity 20. The tang element 32, which may have a non-circular cross-section, may be fixed within the frog 30 as an insert when molded, or may be heated and driven into the frog in a manner similar to the process described below. The surface irregularities 34 preferably have any configuration designed to inhibit removal of the tang element from the frog 30 and the composite tool handle 22. Such surface irregularities 34 may take the form of diamond knurling as illustrated in FIG. 3, or may include bumps or ridges as illustrated in FIG. 4.

The process for assembling the closed back shovel 10 in accordance with the present invention and in its simplest form comprises the steps of heating the tang element 32, placing the frog 30 and the tang element into the back-side cavity 20 of the shovel head 12 so that the tang element extends into the socket 16, aligning a front end of the composite tool handle 22 with the rearwardly extending tang element, and driving the heated tang element into the reinforcing core 28. The reinforcing core 28 is preferably formed of a thermoplastic material such as polystyrene so that as the heated tang element 32 engages the tool handle 22, the thermoplastic reinforcing core is softened to permit entry of the tang element whereby the thermoplastic material flows into intimate contact around the tang element and then hardens as the heat of the tang element is dissipated, to hold the tang element in place.

Figure 7:
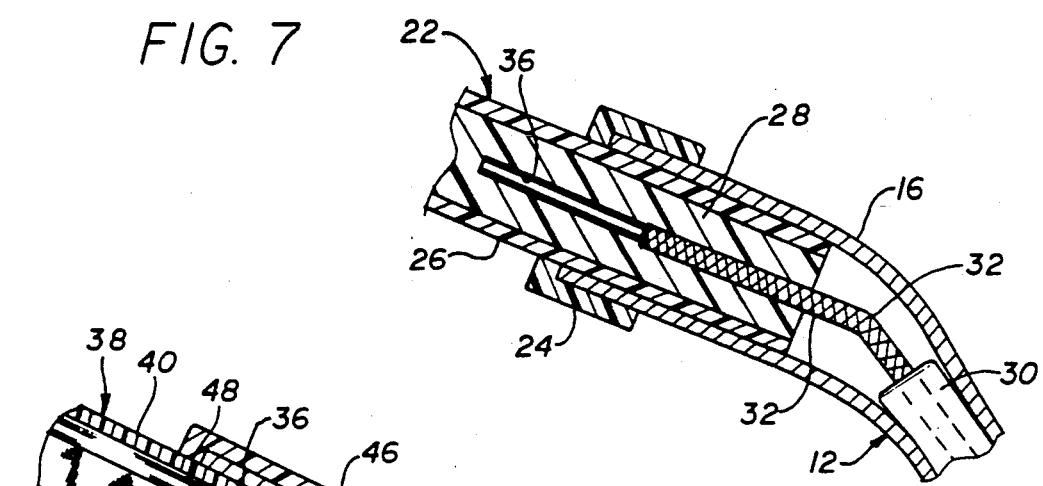
FIG. 7 is an enlarged, fragmented sectional view taken generally of the area indicated by the arrow 7—7 in FIG. 6.

More specifically, as illustrated in FIGS. 6 and 7, the thermoplastic core 28 within the fiberglass rod 26 at the front end of the composite tool handle 22 is provided with an elongate tang receiving channel 36 which extends generally coaxially with the longitudinal axis of the tool handle. The tang receiving channel 36 preferably has cross-sectional dimensions which are less than the cross-sectional dimensions of the tang element 32. This ensures at least a minimal level of interference between the thermoplastic core 28 and the heated tang element 32 when the tang element is driven into the tool handle. This interference is typically within the range of 0.015 inch to 0.025 inch, and ideally about 0.020 inch.

To assemble the shovel 10 utilizing the process of the present invention, the tang element 32 is first heated to a temperature within the range of 300° F. to 500° F. in a heating block. When so heated, the frog 30 and the attached heated tang element 32 are positioned within the back-side cavity 20 and socket 16 of the shovel head 12. A sub-assembly of the frog 30, the tang element 32 and the shovel head 12 is placed within a suitable jig. The composite tool handle 22 is then aligned with the shovel head 12 so that a front end is placed within a rear opening of the socket 16, to place the tang receiving channel 36 within the reinforcing core 28 in alignment with the tang element 32. The tool handle 22 is then driven into the socket 16 so that the tang element 32 is forced into the tang receiving channel 36. The thermoplastic material of the thermoplastic core 28 surrounding the tang receiving channel 36 flows into intimate contact around the tang element 32 and then hardens as the heat of the tang element is dissipated to hold the tang element in place. The tang element 32 provides a means for interconnecting the frog 30 and the forward end of the composite tool handle 22, within the handle receiving socket 16, to secure the tool handle to the shovel head 12.

Figure 8:
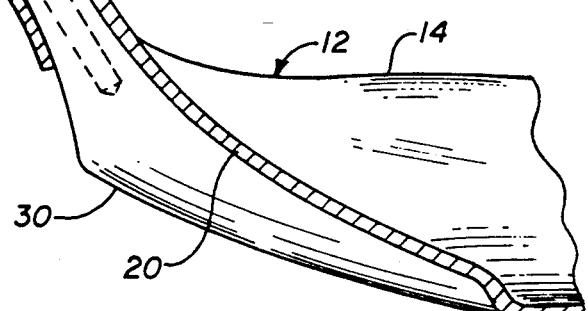
FIG. 8 is an enlarged sectional view similar to that illustrated in FIG. 6, illustrating use of an alternative composite tool handle including an integral socket filler.

In another preferred form of the invention illustrated in FIG. 8, an alternative composite tool handle 38 is utilized which includes a thermoplastic jacket 40 surrounding a fiberglass rod 26. The forward end of the tool handle 38 comprises a flexible core 42 formed by the thermoplastic material of the jacket 40. The flexible core 42 is provided to fit within the handle receiving socket 16 of the shovel head 12 to minimize the possibility of the socket buckling or collapsing under high bending stresses, and is similar to the flexible core illustrated in U.S. Pat. No. Re. 32,364.

More particularly, the flexible core 42 is intended to provide compressive support for the portion of the socket 16 which would normally be empty following assembly of the shovel 10. To provide for flexibility of the flexible core 42, a series of grooves 44 are formed around the periphery of the core and spaced from each other along the length of the core to form a series of socket fillers 46 which serve to support the handle receiving socket 16. The series of peripheral grooves 44 leaves a central shaft 48 running continuously along the axis of the core 42, and the shaft 48 is flexible enough to bend and conform to the configuration of the socket 16. This bending is facilitated by the spaces provided between the socket fillers 46.

To assemble a closed back shovel 10 utilizing the composite tool handle 38, the same process set forth above is utilized. Specifically, an elongate tang receiving channel 36 is provided along the longitudinal axis of the shaft 48 of the flexible core 42. Again the tang receiving channel 36 preferably has cross-sectional dimensions which are less than the cross-sectional dimensions of the tang element 32. The tang element 32 is heated to a suitable temperature, and then the frog 30 and the tang element 32 are positioned within the back-side cavity 20 and socket 16 of the shovel head 12. The sub-assembly of the frog 30, the tang element 32 and the shovel head 12 is placed within a suitable jig, and then the composite tool handle 38 is aligned with the shovel head so that the flexible core 42 is placed within the handle receiving socket 16. The tool handle 38 is driven into the socket 16 so that the tang element 32 is forced into the tang receiving channel 36 in the flexible core 42, to interconnect the frog and the composite tool handle.

From the foregoing it is to be appreciated that the novel process for assembling a closed back shovel as described in detail above provides an efficient means for attaching standard open back shovel heads to the ends of composite handles in a manner forming a closed back shovel. Since the use of epoxy and other bonding agents has been eliminated, there is no need for special handling of the shovel immediately following assembly. Moreover, the present invention provides a highly efficient process for manufacturing a closed back shovel since the prior required processes of welding a cover over the back-side cavity 20, grinding off the slag and annealing the shovel head 12, has been eliminated through the simple use of a frog 30. The frog 30 simplifies attachment of the tool handle to the tool head, utilizing the process of driving a heated tang element 32 into a tang receiving channel 36 provided in a thermoplastic section of the tool handle 22.

Although two particular embodiments of the invention have been described in detail for purposes of illustration, various modifications may be made without departing from the spirit and scope of the invention. Accordingly, the invention is not to be limited, accept as by the appended claims.

I claim:

1. A closed back shovel, comprising:
   an open back shovel head including a blade portion, a back-side cavity in the blade portion, and a handle receiving socket extending rearwardly from the blade portion;
   a composite tool handle having a forward end adapted for insertion into the handle receiving socket of the shovel head, the forward end including a thermoplastic section;
   a frog situated within and configured to fill the back-side cavity of the blade portion; and
   a tang having a first end secured to the frog, and a second end secured to the forward end of the tool handle, wherein the tang interconnects the frog and the forward end of the tool handle within the handle receiving socket to attach the tool handle to the shovel head and to prevent the tool handle and the frog from becoming disassociated from the shovel head.

2. A closed back shovel as set forth in claim 1, wherein at least a portion of the frog comprises a thermoplastic material, and extends from the back-side cavity into the handle receiving socket of the shovel head, and wherein the second end of the tang is secured within the thermoplastic section of the tool handle, and the first end of the tank is secured within the thermoplastic portion of the frog.

3. A closed back shovel as set forth in claim 2, wherein the tang includes surface irregularities to inhibit removal of the tang from the thermoplastic section of the tool handle and the thermoplastic portion of the frog.

4. A closed back shovel as set forth in claim 2, wherein the thermoplastic section of the tool handle includes a flexible core which, with the frog, substantially fills the handle receiving socket.

5. A closed back shovel as set forth in claim 4, wherein the flexible core includes an elongated, generally cylindrical body, at least one groove formed in said body forming at least one socket filler for bearing a compressive load in the handle receiving socket, and a flexible shaft capable of bending to permit the core to conform to the shape of the handle receiving socket.

6. A closed back shovel as set forth in claim 1, including a compression collar surrounding adjacent portions of the handle and the handle receiving socket.

7. A closed back shovel, comprising:
   an open back shovel head including a blade portion, a back-side cavity in the blade portion, and a handle receiving socket extending rearwardly from the blade portion;
   a tool handle having a forward end adapted for insertion into the handle receiving socket of the shovel head;
   a frog situated within and configured to fill the back-side cavity of the blade portion; and
   means for interconnecting the frog and the forward end of the tool handle, within the handle receiving socket, to secure to the tool handle to the shovel head, the interconnecting means including a tang element having a first end secured to the frog, and a second end secured to the tool handle, wherein the attachment of the tang element to both the frog and the tool handle prevents each from becoming disassociated with the shovel head.

8. A closed back shovel as set forth in claim 7, wherein the forward end of the tool handle includes a thermoplastic section having an elongate tang receiving channel into which the second end of the tang element is driven to interconnect the frog and the shovel head.

9. A closed back shovel as set forth in claim 8, wherein the tang element has cross-sectional dimensions greater than the cross-sectional dimensions of the elongate tang receiving channel.

10. A closed back shovel as set forth in claim 9, wherein the interference between the cross-sectional dimensions of the tang element and the cross-sectional dimensions of the tang receiving channel is within the range of 0.015 inch to 0.025 inch.

11. A closed back shovel as set forth in claim 10, wherein the tang element includes surface irregularities to inhibit removal of the tang element from the tang receiving channel.

12. A closed back shovel as set forth in claim 8, wherein the thermoplastic section of the tool handle includes a flexible core which, with the frog, substantial'y fills the handle receiving socket, wherein the flexible core includes an elongated, generally cylindrical body, at least one groove formed in said body forming at least one socket filler for bearing a compressive load in the handle receiving socket, and a flexible shaft capable of bending to permit the core to confirm to the shape of the handle receiving socket.

13. A closed back shovel as set forth in claim 8, wherein at least a portion of the frog comprises a thermoplastic material having an elongate tang receiving channel, wherein the tank element is secured to the frog by driving the first end thereof into the frog elongate tang receiving channel.

14. A closed back shovel, comprising:

an open back shovel head including a blade portion, a back-side cavity in the blade portion, and a handle receiving socket extending rearwardly from the blade portion;

a composite tool handle having a forward end adapted for insertion into the handle receiving socket of the shovel head, for forward end including a thermoplastic section having an elongate tang receiving channel;

a frog situated within and configured to fill the back-side cavity of the blade portion, wherein at least a portion of the frog comprises a thermoplastic material having an elongate tang receiving channel, and extends from the back-side cavity into the handle receiving socket of the shovel head; and means for interconnecting the frog and the forward end of the tool handle within the handle receiving socket to secure the tool handle to the shovel head, the interconnecting means including a tang element having cross-sectional dimensions greater than the cross-sectional dimensions of the elongate tang receiving channels, wherein the tang element is driven into both tang receiving channels to interconnect the frog and the shovel head.

15. A closed back shovel as set forth in claim 14, wherein the interference between the cross-sectional dimensions of the tang element and the cross-sectional dimensions of the tang receiving channels is within the range of 0.015 inch to 0.025 inch.

16. A closed back shovel as set forth in claim 14, wherein the tang element includes surface irregularities to inhibit removal of the tang element from the tang receiving channels.

17. A closed back shovel as set forth in claim 14, wherein the thermoplastic section of the tool handle includes a flexible core which, with the frog, substantially fills the handle receiving socket.

18. A closed back shovel as set forth in claim 17, wherein the flexible core includes an elongated, generally cylindrical body, at least one groove formed in said body forming at least one socket filler for bearing a compressive load in the handle receiving socket, and a flexible shaft capable of bending to permit the core to conform to the shape of the handle receiving socket.

19. A closed back shovel as set forth in claim 14, including a compression collar surrounding adjacent portions of the handle and the handle receiving socket.

* * * * *

UNITED STATES PATENT AND TRADEMARK OFFICE
CERTIFICATE OF CORRECTION

PATENT NO. : 5,310,230
DATED : May 10, 1994
INVENTOR(S) : Joseph A. Carmien

It is certified that error appears in the above-identified patent and that said Letters Patent is hereby corrected as shown below:

In column 7, line 62, delete "tank" and insert --tang--.

In column 8, line 60, delete "confirm" and insert --conform--.

In column 8, line 65, delete "tank" and insert --tang--.

In column 9, line 7, delete "for" and insert --the--.

Signed and Sealed this

Fourth Day of October, 1994

Attest:

BRUCE LEHMAN

Attesting Officer

Commissioner of Patents and Trademarks